Fig. 1

INVENTORS
GEORGE C. HOCKENBERGER
JOHN R. TURNER
ATTORNEYS

May 25, 1954  G. C. HOCKENBERGER ET AL  2,679,204
TRANSFER AND EMBOSSING MACHINE
Filed May 3, 1951  8 Sheets-Sheet 4

INVENTORS
GEORGE C. HOCKENBERGER
JOHN R. TURNER
BY
John H. Lewis Jr.
ATTORNEYS

INVENTORS
GEORGE C. HOCKENBERGER
JOHN R. TURNER
BY

ATTORNEYS

Fig. 13

INVENTORS
GEORGE C. HOCKENBERGER
BY    JOHN R. TURNER
ATTORNEYS

Patented May 25, 1954

2,679,204

UNITED STATES PATENT OFFICE 2,679,204

TRANSFER AND EMBOSSING MACHINE

George C. Hockenberger, Bridgeport, Conn., and John R. Turner, Glen Mills, Pa., assignors to Remington Arms Company, Inc., Bridgeport, Conn., a corporation of Delaware Application May 3, 1951, Serial No. 224,386

20 Claims. (Cl. 101—5)

This invention relates to apparatus for performing an operation upon a workpiece of metal or plastic while such workpiece is being moved in synchronism with a continuously moving conveyor.

The particular operation upon the workpiece which will be described is the impressing or embossing therein of a pattern or design of any desired configuration and including any desired indicia.

While many of the aspects of the invention are of broad application, it will be described with particular reference to the embossing of metal cups or "caps" which form one component of an assembled shot shell. Portions of the metal of the cylindrical wall of such a cap are displaced inwardly in any desired pattern, such inward displacement having the function of forming a partial interlock of the cap with the paper or plastic body of a shot shell with which the cap is subsequently assembled. The pattern of such inward displacement may be merely an ornamental design or may embody a manufacturer's name or trade-mark. The particular machine to be described is adapted to form one unit of a composite machine in which the components of an assembled and primed, but unloaded, shot shell are introduced into suitable receptacles in continuously moving conveyor chains, are operated on at various stations, and eventually assembled into a shot shell ready for loading.

The general functioning of the machine is as follows:

Plain metal caps in head-down position are brought to the machine loosely held in the bushings of a cap chain which is caused to traverse a segment of a sprocket wheel which is an element of a continuously revolving turret. The caps are sequentially transferred out of the cap chain bushings to tools which perform an embossing operation. After embossing, the caps are temporarily placed in bushings in the sprocket wheel and are subsequently displaced from such bushings into dies of an assembly chain which traverses another segment of the same sprocket wheel.

Workpiece W are conveyed to the machine in individual workpiece holding bushings 15 (Fig. 7) held in apertures in arms 16 secured to a continuously moving cap chain 17. The workpieces illustrated are metal caps arranged head-down in the bushings 15 in which they are supported by a fixed rail 18 which follows the course of the cap chain 17. Each bushing 15 and its supporting arm 16 is slotted through as shown at 19, for a purpose which will hereinafter appear. The cap chain traverses an idler sprocket 20 by which it is guided to engage sprocket 21 of the embossing machine, by which the cap chain is driven. Sprocket 21 (Fig. 1) is also the driving element of a turret, the frame of which is identified by numeral 22, mounted for rotation about a fixed pedestal 23 extending upwardly from base 24. Supported on base 24 is a circular skirt 25 to which is secured a cam member 26. Associated with skirt 25 is a table 27 upon which are mounted the sprocket idler 20 and certain other sprockets to be described. Extending upwardly from table 27 are posts 28 which carry a ring-shaped member 29 supporting a ring-shaped cam plate 30. The parts described in this paragraph (except sprocket 21) are stationary. Most of the elements to be described are mounted on the turret 22 and are in constant rotary motion about the pedestal 23.

As the cap chain 17 engages the turret sprocket 21, each workpiece holding bushing 15 in turn comes into alignment with one of a set of workpiece shifting and embossing tools symmetrically disposed on the turret. Various positions of the tools are shown in Figs. 2 to 6. Each set of tools comprises an embossing head 31, an embossing bar 32 slidably held in a dovetail member 321, a lifter 33, and a feeler or gripper 34. Each embossing head 31 is carried at the lower end of an embossing arbor 35 mounted in ball bearings 36 in a member 37 secured to the turret frame. Each embossing arbor 35 is aligned with and coupled to a drive shaft 38 likewise mounted in ball bearings in member 37. Each shaft 38 carries a pinion 39 adapted to be driven by a rack 40 secured to a bar 41 mounted for radial sliding movement in member 37. The outer end of each bar 41 comprises an enlarged head 43 which carries a cam follower 44 adapted for engagement in a cam track 45 in the fixed member 30 heretofore mentioned. The configuration of cam track 45 is such that during each revolution of the turret the rack 40 is moved radially inward to perform an embossing operation, remains an appropriate interval in its advanced (Fig. 3) position while an embossed cap is removed from the embossing arbor, and is then restored to its normal (Fig. 2) position. It will be obvious that such radial movement of rack 40 rotates shaft 38, arbor 35 and embossing head 31. In the surface of the embossing head there is impressed the design which it is desired to emboss upon the workpiece. The design illustrated consists of a repetition of the letter R.

Each embossing arbor 35 carries adjacent the embossing head 31 a pinion 46 which is engaged by a rack 47 secured to or integral with an embossing bar 32 mounted for radial sliding movement on the aforementioned support 37, or a part secured thereto. Each embossing bar comprises a projecting panel 49 from which are raised characters which are counterparts of those impressed in the embossing arbor. The end portions of panel 49 are cut-back as shown at 50 to provide clearance between these portions of the embossing bar and the embossing arbor. The characters on the bar are so positioned with respect to the embossing arbor as to displace metal corresponding to such characters inward into the recessed characters on the arbor when the embossing bar traverses the embossing head in synchronism with the rotation of said head.

Each embossing head 31, as above set forth, comprises character indentations or depressions into which the metal of the workpiece is displaced by the counterpart raised characters on the embossing bar 32. To permit removal of the embossed workpiece, the diameter of the embossing head must be less than the interior diameter of the workpiece by an amount equal to twice the inward displacement of the metal, and the circumference of the embossing head is shortened proportionately. The length of the working surface of the embossing bar 32 is equal to the exterior circumference of the workpiece, and the arrangement must be such that each raised character on the embossing bar in turn comes opposite a depressed character on the shorter circumference of the embossing head. This is accomplished by making the character depressions in the embossing head of slightly greater circumferential width than the counterpart character projections on the embossing bar, and driving the embossing bar at a slightly greater linear speed than that of the embossing head. During the embossing operation, the workpiece "creeps" slightly with respect to the embossing head, while being constrained by its engagement with the raised characters on the embossing bar to move with the same linear speed as the bar. The necessary differential between the rates of movement of the embossing bar and the embossing head respectively is secured by making the pitch diameter of the embossing bar driving pinion 46 greater than the diameter of the embossing head by an amount proportional to the difference between the diameter of the embossing head and the exterior diameter of the workpiece.

Figure 1:
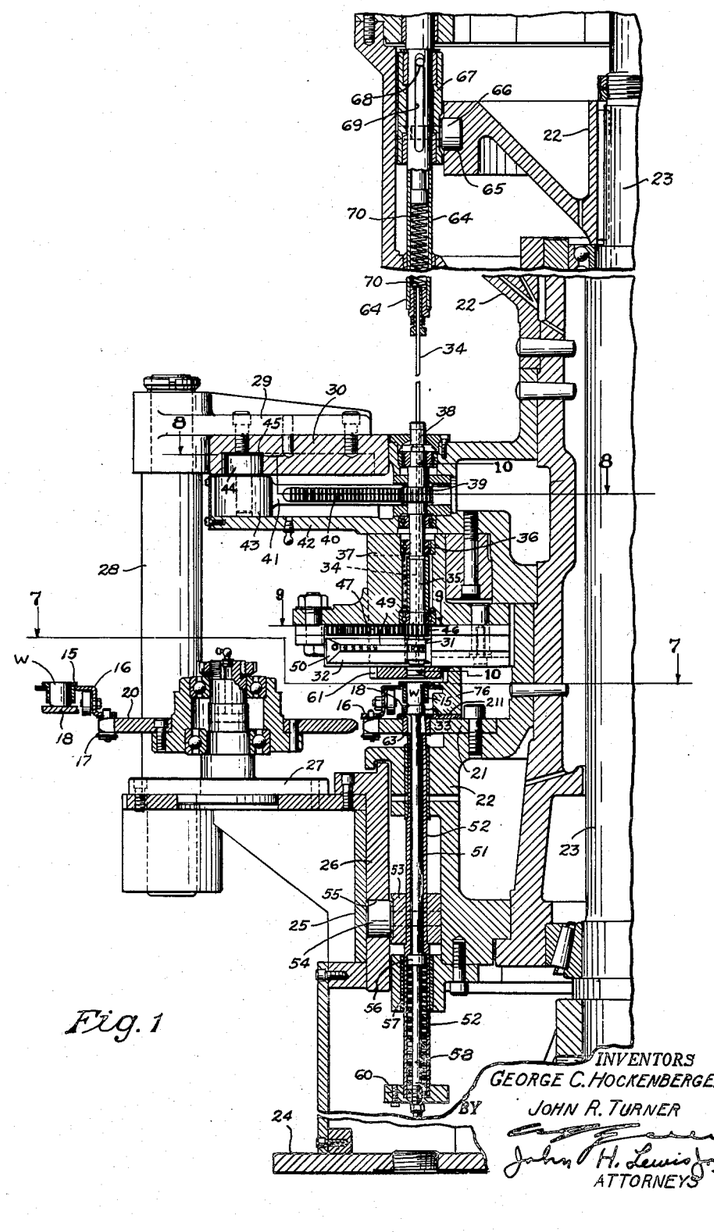
Fig. 1 is a one-half sectional side elevation of a machine constructed in accordance with one embodiment of the present invention, the section being substantially on the line 1—1 of Fig. 7.

A workpiece entering the machine in a cap chain bushing 15 is supported in such bushing on the head of a lifter 33 in the position illustrated in Fig. 1. Lifter 33 is secured to the upper end of a lifter operating rod 51 housed in a vertically reciprocating sleeve member 52 provided with a boss 53 which rotatably supports a cam follower 54 received in a cam groove 55 in the aforementioned fixed ring 26. The configuration of cam groove 55 is such as to effect the sequence of movements of the lifter to be described. A spring cushion connection is provided between the driving sleeve 52 and lifter operating rod 51. A head 56 on the lifter operating rod engages an internal shoulder on sleeve 52, being held against said shoulder by a spring 57 which encircles a reduced diameter portion 58 of rod 51 and abuts a head 60 secured to the lower end of sleeve 52. Rod portion 58 passes freely through an aperture in head 60. In the normal operation of the machine spring 57 is not compressed but its yield obviates smash-ups in the event that the motion of the lifter is obstructed.

Figure 13:
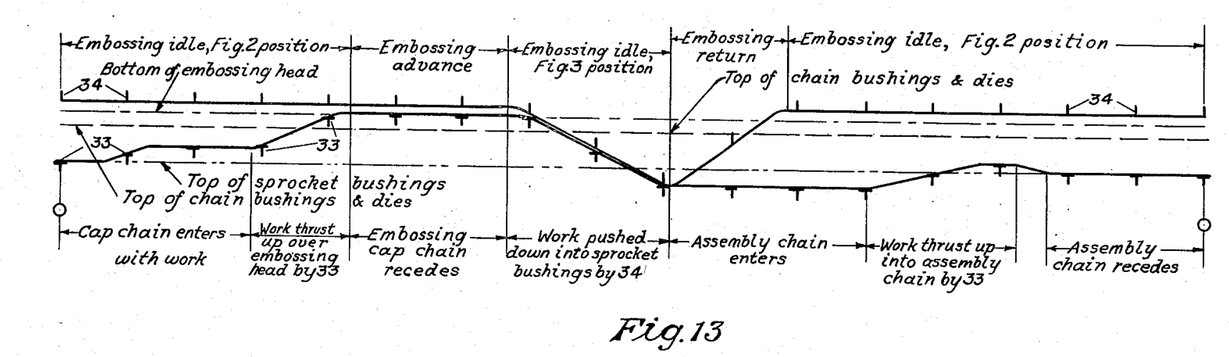
Fig. 13 is a diagrammatic development illustrating the movement of the work-shifting tools.

A workpiece being in the machine in the position shown in Fig. 1, the first operation is to lift the workpiece from the cap chain bushing 15 onto the embossing head 31. This is performed by cam 55 elevating the lifter from Fig. 1 position to Fig. 2 position, where it remains, supporting the workpiece, during the embossing operation (Fig. 13). The embossing bar 32 is in its retired or outermost position, the cutout 50 at the inner end thereof standing opposite the embossing head to provide clearance for the upward movement of the cap. In this movement the cap passes through an aperture in a guide-and-support plate member 61 secured to each embossing bar support. At this point in the revolution of the turret, cam follower 44 engages an active surface of cam 45, moving the rack 40 and with it the embossing bar radially inward to perform an embossing operation. The work and the tools are now in the position shown in Fig. 3. While the cap is thus held on the embossing head and free from the cap chain bushing, the cap chain recedes from turret sprocket 21, passing around idler sprocket 62. The lifter 33 at this time extends upwardly through the bushing and its holder and as the chain recedes traverses the aforementioned slot 19 in bushing and holder.

Figure 2:
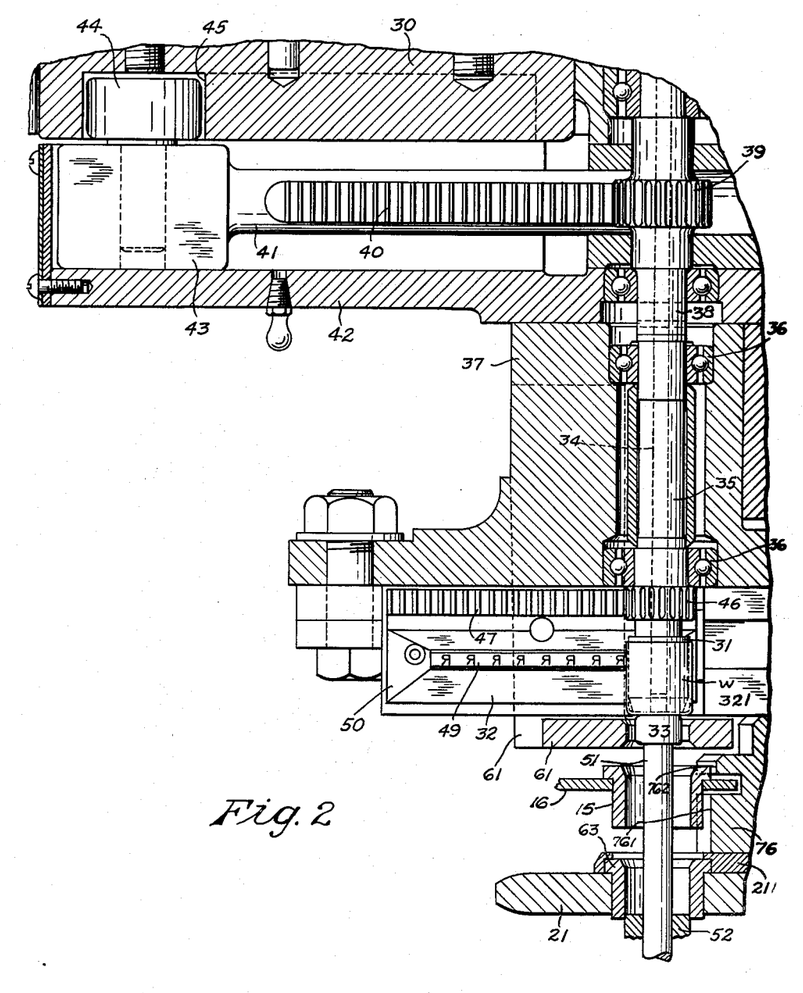
Figs. 2 to 6, inclusive, are fragmentary sectional elevations showing various positions of the work and tools as the work progresses through the machine, each section being on a line identified by figure number on Fig. 7.
Figure 3:
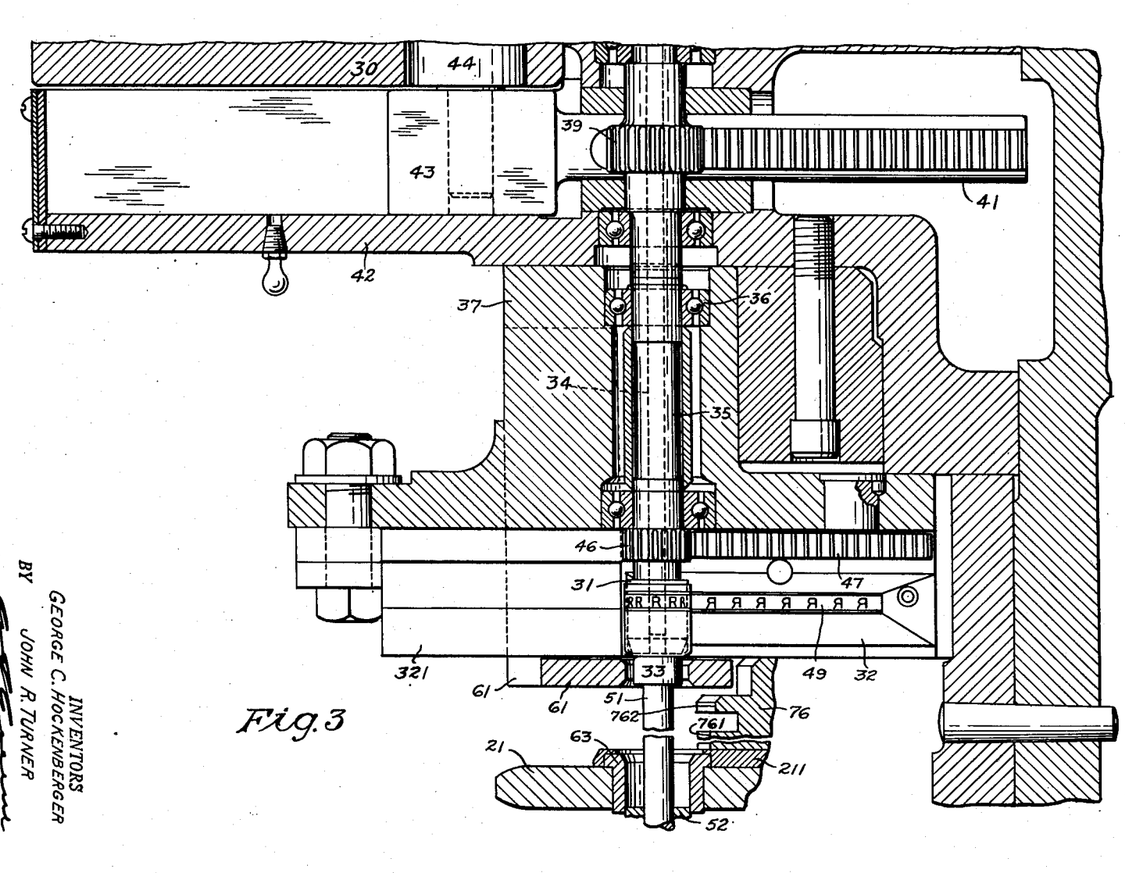
Figure 4:
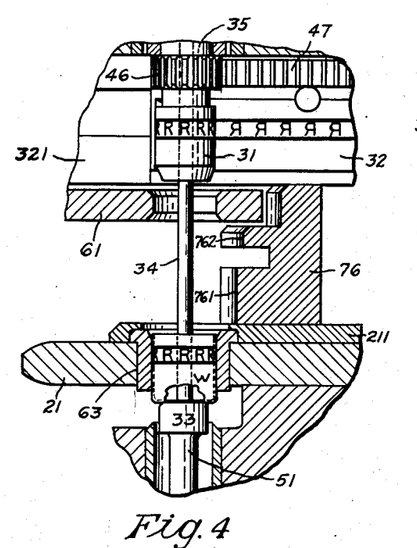
Figure 5:
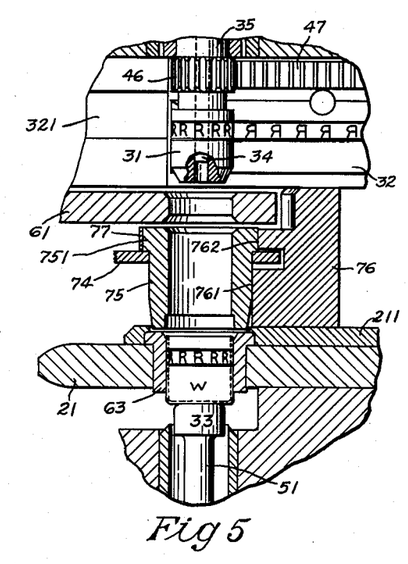
Figure 7:
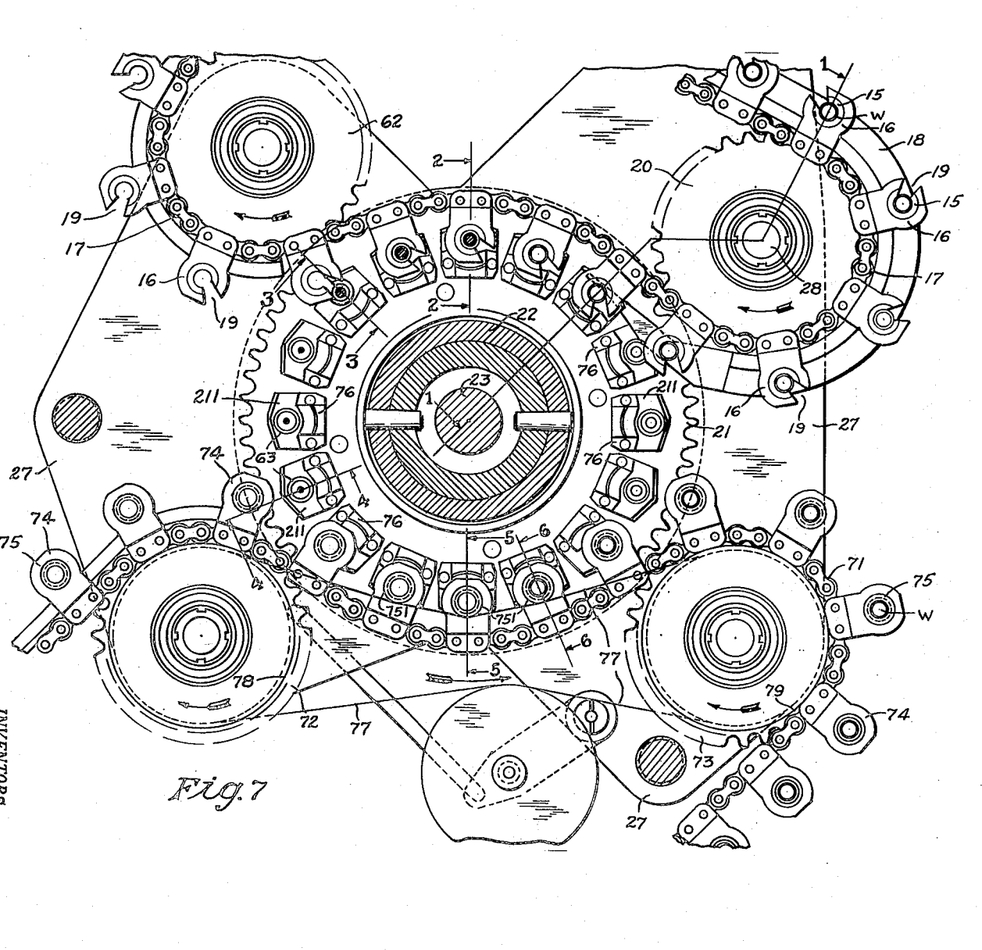
Fig. 7 is a sectional plan view substantially on the line 7—7 of Fig. 1.
Figure 8:
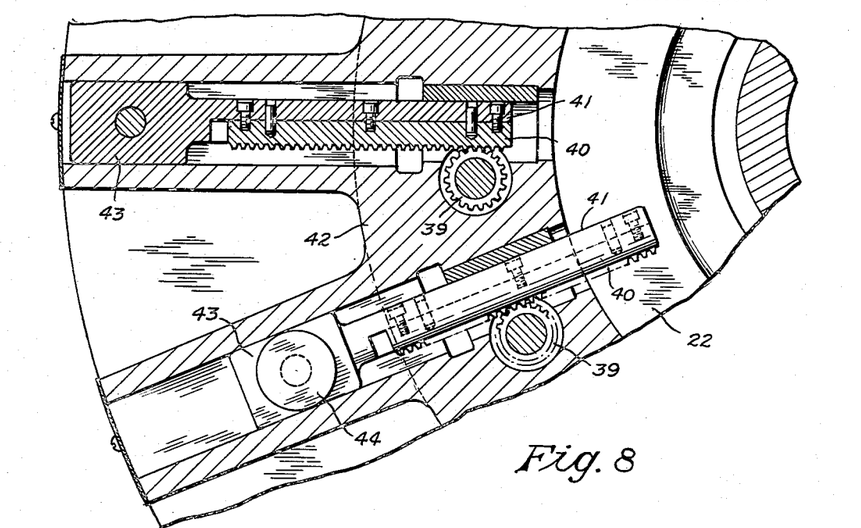
Fig. 8 is a fragmentary sectional plan view of the embossing bar, the section being substantially on the line 8—8 of Fig. 1.
Figure 9:
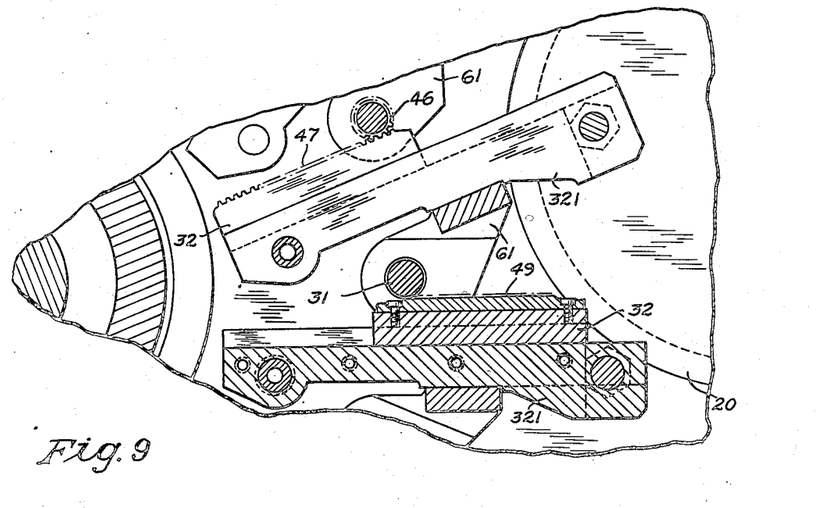
Fig. 9 is a fragmentary sectional plan view of the embossing arbor operating cam and rack, the section being substantially on the line 9—9 of Fig. 1.
Figure 10:
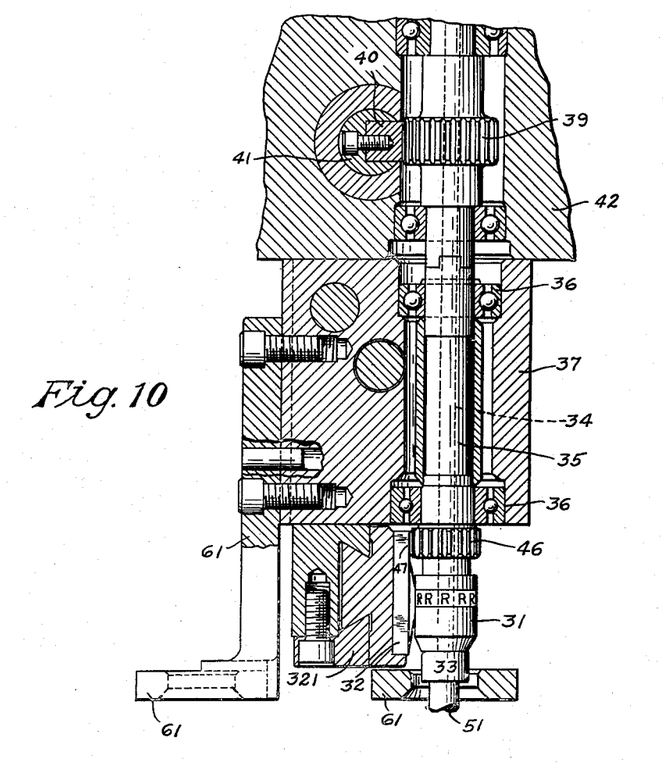
Fig. 10 is a fragmentary sectional elevation substantially on the line 10—10 of Fig. 1, showing the mounting of the embossing bar and the embossing arbor operating rack.
Figure 11:
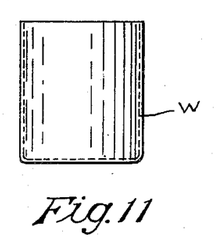
Fig. 11 is a side elevation of a workpiece as fed to the machine.
Figure 12:
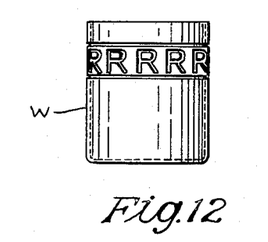
Fig. 12 is a side elevation of a workpiece as delivered by the machine.

The next operation is to remove the embossed workpiece from the embossing head and place it temporarily in a bushing 63 held in an aperture in sprocket 21 by shouldered openings in a ring 211 secured to sprocket 21. This is done by gripper 34 operating in synchronism with lifter 33. Gripper 34 is a slender rod occupying aligned apertures in embossing arbor 35 and its drive shaft 38. In its normal or retracted position, it terminates a short distance within embossing head 31, as shown in Figs. 1, 2 and 3. The upper end of gripper 34 (Fig. 1) is received in a hollow cylindrical holder 64 mounted in the turret frame and vertically reciprocated by a box cam 65 secured to the upper end of pedestal 23 and engaged by cam follower 66 rotatably mounted on boss 67 secured to member 64. A pin-and-slot connection 68—69 and a spring 70 supply a yielding drive to sleeve 64 and gripper 34. During the operations of lifting and embossing the workpiece, as heretofore described, the gripper 34 remains in its uppermost position. At about the position shown in Fig. 4, the cam follower 66 engages an active surface of cam 65, and the gripper descends until it contacts the inside of the cap head. Thereafter, gripper 34 and lifter 33 move downward in unison, carrying an embossed workpiece with them into a bushing 63 in sprocket 21, as seen in Figs. 4 and 5. As shown in Fig. 7, at the position illustrated in Fig. 5 sprocket 21 is engaged by an assembly chain 71 which is guided into engagement with the sprocket by idler 72 mounted on table 27, and leaves turret sprocket 21 over idler 73 likewise mounted on table 27. The function of assembly chain 71 is to convey the embossed workpiece out of the embossing unit and to other units performing other operations. Arms 74 secured to chain 71 support dies 75. In the Fig. 5 position a die 75 is disposed in vertical alignment with sprocket bushing 63. To insure alignment of die 75 with bushing 63, a member 76 secured to the sprocket is provided with curved surfaces 761 and 762 adapted to engage respectively with the body and flange of die 75, and adjacent to the Fig. 5 position the die flange 751 is engaged by a belt 77 which traverses pulleys 78—79 mounted concentric with idlers 72 and 73 respectively. A tightener for belt 77 may be mounted on table 27.

Figure 6:
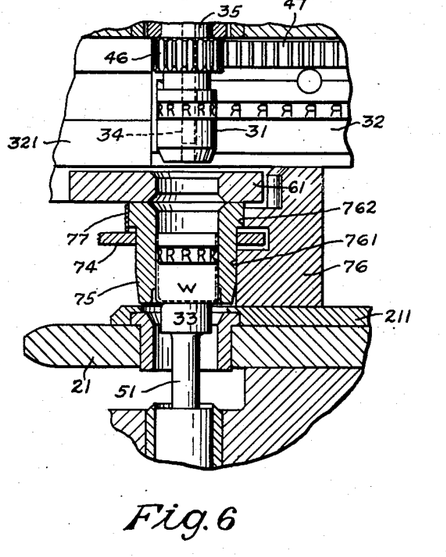

It will be noted that in Fig. 5 gripper 34 has retired to its uppermost position. This, of course, takes place before die carrier 74 moves across the top of the sprocket bushing 63. In the continued rotation of the turret, from the Fig. 5 position to the Fig. 6 position, lifter 33 is moved upward by its cam 55, thrusting the embossed workpiece into a die 75. Subsequent operations may require that the workpiece fit closely in said die, and, as shown in Fig. 6, the thrust of lifter 33 on the workpiece may lift the die out of supported contact with its carrier arm 74, such upward movement of the die being stopped by its engagement with the underside of support plate 61. The workpiece being properly positioned in a die 75, the lifter is retired slightly, the die coming to rest on its supporting arm 74. All tools have now been restored to the Fig. 1 position, ready for a repetition of the cycle.

The foregoing description has detailed a single embossing unit and associated parts. It will be remembered that there are a plurality of such units, say sixteen, symmetrically disposed about the turret and that the successive cap chain bushings 15 and assembly chain dies 75 come into alignment with the succession of operating tools on the turret, each set of tools in turn passing through the described cycle of movement. The turret is driven by the assembly chain 71, which chain is driven by an external source of power.

The embodiment of the invention which has been described is illustrative rather than restrictive, many parts thereof being susceptible to embodiment in other forms.

What is claimed is:

1. Apparatus for the embossing of workpieces comprising a continuously revolving turret, a feed conveyor traversing a part of the periphery of said turret, means for moving said turret and said conveyor in synchronism, spaced workpiece holding receptacles on said conveyor, spaced working stations on said turret arranged for alignment with workpieces in said receptacles as said conveyor traverses said turret, workpiece embossing tools at each of said stations, a lifter at each of said stations for lifting a workpiece from a conveyor receptacle into an embossing position in operative relation with said embossing tools and retaining said workpiece disengaged from said conveyor as said conveyor recedes from said turret, a common actuator for said plurality of workpiece lifters, means for actuating said embossing tools to emboss a workpiece in embossing position, and means for removing an embossed workpiece from embossing position.

2. Apparatus according to claim 1, comprising individual workpiece storage receptacles on said turret and means for transferring embossed workpieces from said embossing position into said storage receptacles.

3. Apparatus according to claim 2, in which said storage receptacles are located in apertures in a sprocket wheel secured to said turret and engaged by said feed conveyor.

4. Apparatus according to claim 2, comprising a finished work conveyor arranged to traverse a part of the periphery of said turret and having thereon spaced finished work receiving dies arranged for alignment with said storage receptacles, and means for moving finished workpieces from said storage receptacles into said dies.

5. Apparatus according to claim 4, in which the common actuator for said plurality of workpiece lifters comprises a cam of such configuration that each lifter continuously supports a workpiece from the time such workpiece in a feed conveyor receptacle enters the turret until such workpiece is seated in a die in the finished work conveyor.

6. Apparatus according to claim 5, comprising a plurality of workpiece grippers located respectively at said working stations, and means for actuating said grippers in synchronism with said lifters.

7. Apparatus according to claim 6, in which each gripper is withdrawn from engagement with said workpiece while said workpiece is in said storage receptacle to enable said finished work receiving die to move into alignment with said receptacle.

8. Apparatus according to claim 7, comprising a common operator for said plurality of grippers, and yielding driving connections from said operator to each of said grippers.

9. Apparatus according to claim 8, in which said common operator is a fixed cam traversed by each of a plurality of cam followers associated respectively with said grippers.

10. Apparatus according to claim 4, comprising means for aligning said dies with said storage receptacles, said means comprising abutments on said turret adapted to peripherally engage said dies, and means urging said dies into engagement with said abutments.

11. Apparatus according to claim 10, comprising a second abutment adapted for endwise engagement with said die when said die is displaced by the thrust of a workpiece being moved into said die by said lifter.

12. Apparatus according to claim 11, in which said second abutment comprises an aperture traversed by a workpiece in transit from a feed conveyor receptacle to embossing position.

13. Apparatus according to claim 1, in which said embossing tools comprise an embossing head adapted to be received within a cup-shaped workpiece and an embossing bar adapted to exteriorly engage a workpiece positioned on said head.

14. Apparatus according to claim 13, comprising means for moving said embossing head and embossing bar in unison.

15. Apparatus according to claim 14, in which said moving means comprises a pinion associated with said embossing head and a rack associated with said embossing bar and engaged by said pinion.

16. Apparatus according to claim 15, in which said embossing bar comprises a raised panel having thereon indicia to be embossed on a workpiece, and said embossing head carries counterpart indicia in juxtaposition to the indicia on said bar.

17. Apparatus according to claim 16, in which the panel terminates within the length of said embossing bar, thereby providing clearance adjacent either end of the embossing bar for movement of workpieces on and off said embossing head.

18. Apparatus according to claim 17, comprising a rotatable arbor supporting said embossing head, and means for rotating said arbor.

19. Apparatus according to claim 18, in which said arbor rotating means comprises a member mounted for rectilinear movement in said turret and having a rack and pinion connection with said arbor.

20. Apparatus according to claim 19, comprising a cam follower associated with each rectilinearly moving member, and a single fixed cam traversed by said cam followers.

References Cited in the file of this patent

UNITED STATES PATENTS

| Number | Name | Date |
|---|---|---|
| 110,623 | Bement | Jan. 3, 1871 |
| 453,773 | Harper | June 9, 1891 |
| 1,474,473 | Herold | Nov. 20, 1923 |
| 1,620,447 | Donovan | Mar. 8, 1927 |
| 1,647,625 | Higgins | Nov. 1, 1927 |
| 2,201,924 | Schmitt | May 21, 1940 |
| 2,202,762 | Freed | May 28, 1940 |
| 2,344,930 | Ferguson | Mar. 21, 1944 |